June 5, 1962  L. HOHMUTH  3,037,541
EVER READY CARRYING CASES FOR PHOTOGRAPHIC CAMERAS
Filed Dec. 30, 1959  2 Sheets-Sheet 1

June 5, 1962 L. HOHMUTH 3,037,541
EVER READY CARRYING CASES FOR PHOTOGRAPHIC CAMERAS
Filed Dec. 30, 1959 2 Sheets-Sheet 2

United States Patent Office 3,037,541
Patented June 5, 1962

3,037,541
EVER READY CARRYING CASES FOR
PHOTOGRAPHIC CAMERAS
Leopold Hohmuth, Schmiechen, near Schelklingen, Germany, assignor to Zeiss Ikon Aktiengesellschaft, Stuttgart, Germany
Filed Dec. 30, 1959, Ser. No. 862,890
Claims priority, application Germany Jan. 2, 1959
8 Claims. (Cl. 150—52)

The present invention relates to ever ready carrying cases for photographic cameras, particularly for small cameras provided with exchangeable parts.

Ever ready carrying cases in general consist of a case body which is removably connected to the camera by a tripod screw. The case covers at least the rear wall and the bottom of the camera. The front and top portions of the camera being protected by a protective hood which is swingable over the front edge of the camera. The hood is fastened, for instance, to the rear wall of the case by a snap-button fastener provided on a strap of said cover.

This type of carrying cases which closely fit the form of the camera permit a quick preparation of the camera for making exposures by opening the hood and swinging it away from the front of the camera. But, this arrangement does not permit the removal, respectively replacing of exchangeable housing parts of the camera, such as the exchange of film magazines or the like. In such a case the entire camera has to be removed from the carrying case, thus complicating and wasting time in the taking of pictures.

It is an object of the invention to overcome these disadvantages in that at least a portion of the bottom of the carrying case, which covers the exchangeable portions of the camera housing, is arranged to be swingable or removable from the carrying case which contains the camera.

Figure 1:
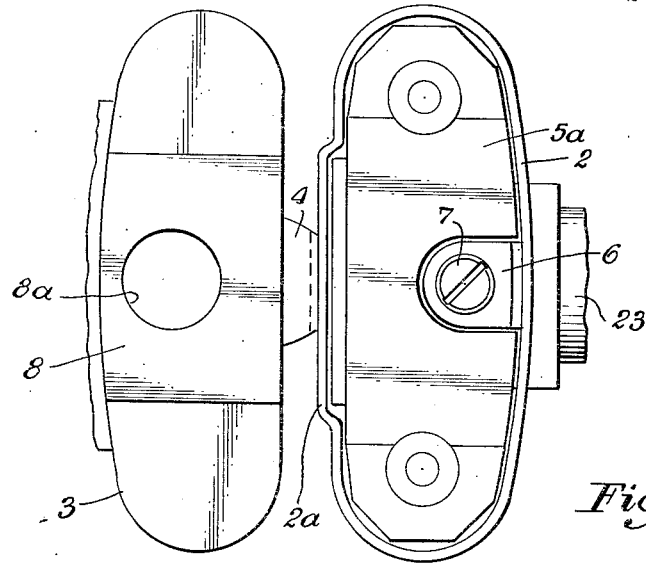
Figure 2:
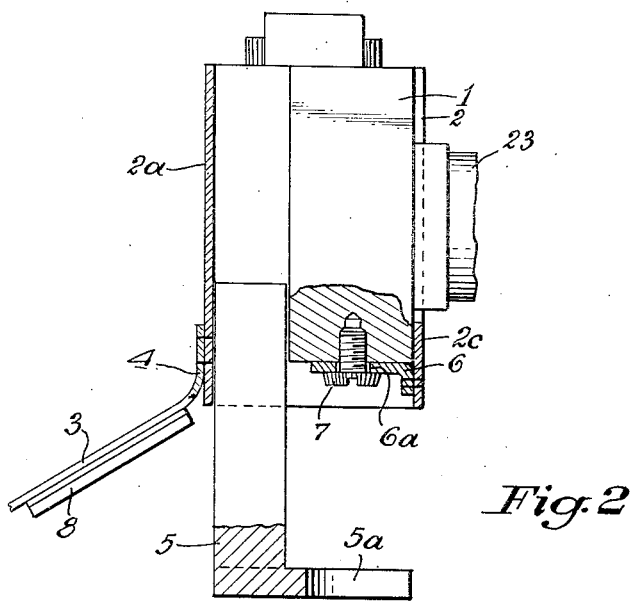
Figure 3:
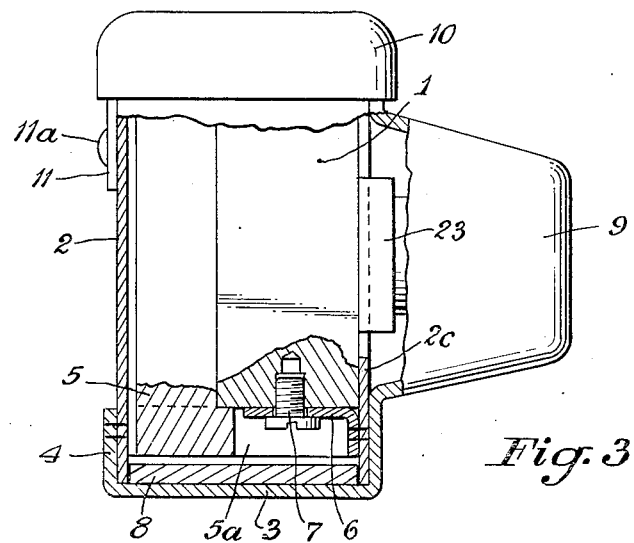
Figure 4:
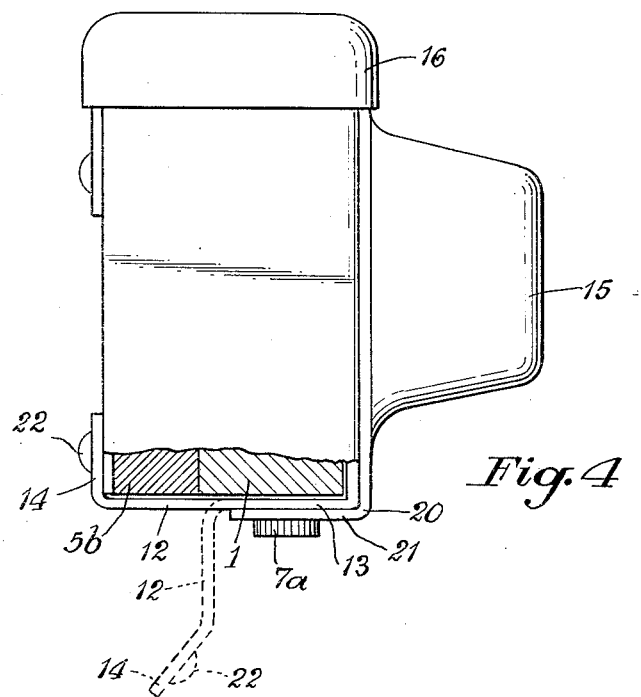

The accompanying drawings disclose by way of example two embodiments of the invention:

FIG. 1 shows a bottom view of the new ever ready carrying case with a camera therein and with a bottom moved away from the case proper, FIG. 2 shows a vertical cross-section of the carrying case with camera therein and swung away bottom, FIG. 3 shows a vertical cross-section of the closed carrying case with camera therein according to FIG. 2, and FIG. 4 shows another embodiment of the carrying case of the present invention.

Referring to the drawings, the carrying case is provided with a body 2 enclosing a camera 1, the case having a front portion 9 and a top portion 10 covering the camera objective 23 and the top portion of the camera 1. One edge of the bottom 3 of the case is attached to the rear wall 2a of the case body 2 by a strap 4 and can be swung in downward direction about a flexible connection formed between this edge and the strap 4 attached to the rear wall of the case. This arrangement is necessary for permitting the removal and replacement of a part 5 of the camera, for instance, of a film spool holder which can be pulled off the camera 1 in a downward direction without removing the entire camera 1 from the case. In order to provide a firm connection between the camera 1 and the case when the bottom 3 of the case is swung downwardly, a special bottom piece 6 is provided at one of the walls of the case, for instance, on the front wall 2c. This piece 6 is disposed above the plane of the swingable bottom 3 of the case. This piece 6 is made very strong and is provided with an aperture 6a through which the tripod screw 7 is inserted which is screwed into the tripod socket provided in the bottom of the camera. Therefore, even when the bottom 3 of the carrying case is swung away, the camera remains firmly anchored to the case.

The swingable bottom 3 is provided with a reinforcement plate 8 which automatically will fit into the inner space of the case when the bottom 3 is moved toward the body 2. The arrangement of the reinforcement plate 8 will provide a firm placement of the bottom 3 within the body 2. As shown in FIG. 1, the bottom 3 with the reinforcement plate 8 thereon is provided opposite the tripod screw 7 with a recess 8a so that the tripod screw 7 can be operated from the outside of the case even when the case is closed. The front edge of the bottom 3 has attached thereto a protective hood 9 for the camera objective 23, as shown in FIG. 3, and the hood 9 has in turn connected thereto a cover 10 which covers the top portion of the camera. The cover 10 has a strap 11 thereon which is attached to the rear wall of the case by a snap-button fastener 11a or the like. When preparing the camera for taking pictures the fastening strap 11 is first released and the cover 10 together with the hood 9 is then swung in a forward direction and then in downward direction. The reinforcement plate 8 on the bottom 3 of the case fits, however, tightly into the body 2 of the case and will not move downwardly when the parts 9 and 10 are moved away from the front of the camera. The bottom 3 of the case will thus remain in its closed position when the camera is in condition for taking pictures. In order to remove the bottom 3 from the case an additional pull has to be exerted on the parts 10 and 11 to remove the reinforcement plate 8 from the body 2 of the case.

As shown in FIGS. 1 to 3 the entire bottom 3 of the case will have to be fully swung outwardly and downwardly in order to permit the removal or insertion of the exchangeable part 5 of the camera because the lower plate 5a of the part 5 extends over the entire bottom face of the camera 1.

When the exchangeable part 5 of the camera 1 extends only over a portion of the bottom face of the camera a modified construction of the case as shown in FIG. 4 may be used to advantage.

In this modification it is assumed that the exchangeable portion 5b of the camera 1 extends only over the rear portion of the bottom face of the camera 1. For a rapid exchange of this part 5b only a portion of the bottom 13 of the case is arranged to be swung out. The swingable portion 12 of the bottom 13 of the case is provided with a closure strap 14 which is attached to the rear wall of the case by a snap fastener 22 or the like. For exchanging the part 5b of the camera, snap fastener 22 is released and then the bottom portion 12 of the case is swung in a downward direction as shown in dotted lines in FIG. 4. In this case the camera is firmly connected to the case by means of the tripod screw 7a inserted through that portion of the bottom 13 of the case which is fixed to the case. The hood 15 covering the camera objective together with the top cover 16 connected thereto are swingable about the lower front edge 20 of the carrying case. The lower edge of the hood 15 is provided with an extension 21 which may be connected, for instance, by a snap button fastener or by means of the tripod screw 7a to the bottom 13 of the carrying case.

What I claim is:

1. In an ever ready camera carrying case for photographic cameras having a bottom lower wall portion and one or more exchangeable parts covered by said wall portion, the improvement comprising means connecting said wall portion to said case for permitting the removal of at least that portion of the bottom of the case which covers the exchangeable part and lower wall portion of the camera, said means including a flexible connection located at the rear of said case between the lower wall portion of said case and the body of the case, whereby said wall portion can be moved to an open position to remove and replace said exchangeable parts.

2. In an ever ready camera carrying case for photographic cameras having one or more exchangeable parts, said case being open at its lower portion to provide an access opening for said parts, and a cover for said opening, the improvement comprising means permitting the removal of at least that portion of the bottom of the case which covers the exchangeable part of the camera housing, said means including a flexible connection between the removable bottom portion and the body of the case, said flexible connection being formed by a strap extending from one edge of said removable bottom portion, said strap being fixedly attached to the lower portion of the rear wall of said case, said case being provided with an inner space directly below the camera.

3. In an ever ready camera carrying case for photographic cameras having one or more exchangeable parts, said case having an access opening in its lower portion, a cover on said case for said opening, the improvement comprising means permitting the removal of the cover of the case for permitting a removal of the exchangeable part of the camera, said means including a flexible connection between said cover and the body of the case, said flexible connection being formed by a strap extending from one edge of said removable cover, said strap being fixedly attached to the lower portion of the rear wall of said case, a removable hood for covering the front wall of the camera attached to the other opposite edge of said removable cover, a removable cap covering the top portion of said camera attached to said hood, a strap attached to said cap, and means for releasably attaching said strap to the rear wall of said case.

4. An ever ready carrying case according to claim 2, including a reinforcement plate attached to the inner face of said removable cover portion and fitting tightly within the inner space of said case directly below the lower wall of the camera.

5. An ever ready carrying case according to claim 2, including a reinforcement plate attached to the inner face of said removable cover portion and fitting tightly within the inner space of said case directly below the lower wall of the camera, said reinforcement plate and said removable cover of the case being provided with an aperture for accommodating a tripod screw which is screwed into the housing of the camera and secures a non-removable portion of the bottom of the case to the camera.

6. An ever ready carrying case according to claim 1, including means for releasably attaching one edge of the removable portion of the bottom to the rear wall of the case, and means forming said flexible connection between the opposite other edge of said removable bottom portion and the other portion of said bottom which is fixedly attached to said casing.

7. An ever ready carrying case according to claim 1, including means for releasably attaching one edge of the removable portion of the bottom of the case to the rear wall of the case, means forming said flexible connection between the opposite other edge of said removable bottom portion and the other portion of said bottom which is fixedly attached to said casing, a removable hood for covering the front wall of the camera attached to said opposite other edge of said bottom, a removable cap covering the top portion of said camera attached to said hood, a strap attached to said cap, and means releasably attaching said strap to the rear wall of said case.

8. In an ever ready carrying case for photographic cameras in which the camera is provided with a bottom wall portion and exchangeable parts, comprising a case having a rear wall portion and an access opening in its lower portion, a cover for said casing extending over the access opening to cover said bottom wall portion and said exchangeable parts, and a flexible connection between the lower rear wall portion of said casing and said cover to permit access to the bottom wall of said camera and said exchangeable parts without removing said camera from the casing.

References Cited in the file of this patent

UNITED STATES PATENTS

| | | |
|---|---|---|
| 2,136,357 | Darling et al. | Nov. 8, 1938 |
| 2,223,219 | Mayerovitz | Nov. 26, 1940 |
| 2,290,307 | Wicker | July 21, 1942 |

FOREIGN PATENTS

| | | |
|---|---|---|
| 909,793 | Germany | Apr. 26, 1954 |
| 963,670 | France | July 18, 1950 |